C. L. WILCOX.
Improvement in Combined Planters and Cultivators.
No. 129,443. Patented July 16, 1872.
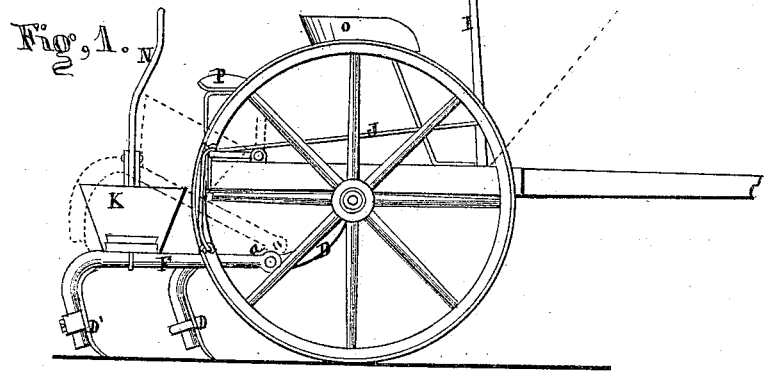
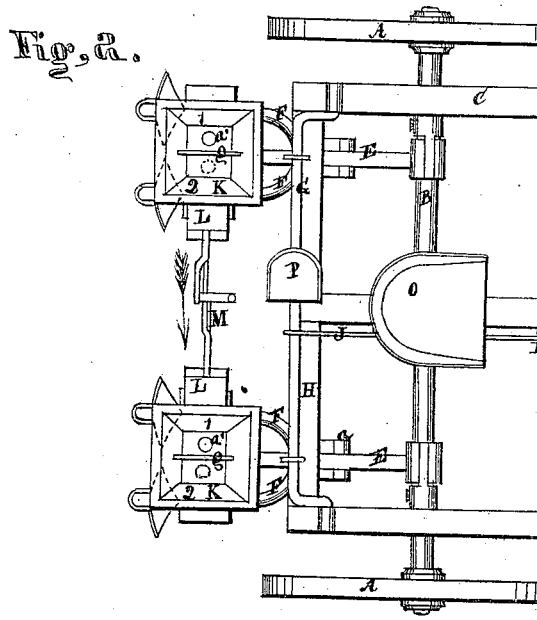
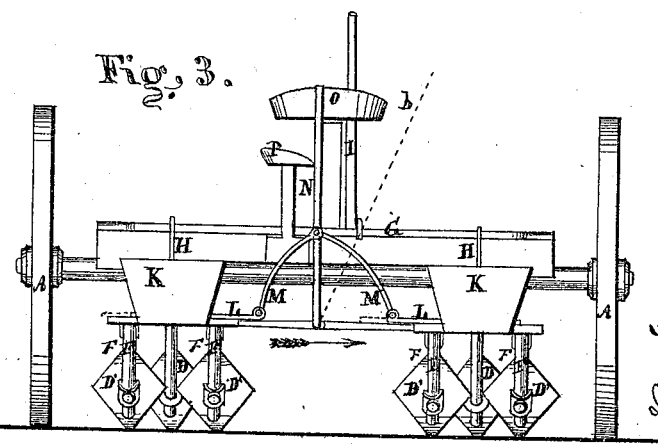
Inventor.
C. L. Wilcox.
per Burridge & Co.
Attys
Witnesses.
J. H. Burridge.
D. L. Humphrey

UNITED STATES PATENT OFFICE.

CAMDEN L. WILCOX, OF WAYNE, OHIO.

IMPROVEMENT IN COMBINED PLANTERS AND CULTIVATORS.

Specification forming part of Letters Patent No. 129,443, dated July 16, 1872.

SPECIFICATION.

*To all whom it may concern:*

Be it known that I, CAMDEN L. WILCOX, of Wayne, in the county of Ashtabula and State of Ohio, have invented certain new and useful Improvements in Corn-Planters, of which the following is a description, reference being had to the accompanying drawing making part of this specification.

Figure 1 is a side elevation of the machine. Fig. 2 is a plan view. Fig. 3 is a view of the rear end.

Like letters of reference refer to like parts in the different views.

The nature of this invention relates to the construction and arrangement of the operating parts of a corn-planter, as hereafter described.

The construction and operation of the same are as follows:

In the drawing, Fig. 2, A represents a pair of wheels on the axle B, on which is mounted the frame C. Near to each end of the axle is connected a gang of cultivators or shovels, D, by means of a link, E. One of said shovels is attached directly to the lower end of the link, and which forms the center one of the gang; whereas the others, D', are connected to the link E by sub-links F, and which form the outside shovels of the gang. Said sub-links are pivoted to the link E at $a$, Figs. 1 and 2; hence the side shovels D' have a movement independent of the center one; therefore, the several shovels are free to run into the ground more or less independently of each other, and thereby stir the ground more effectually than if the several shovels were all fixed in a rigid frame; and more especially is this the case when the ground is uneven and full of hollows. The two gangs of plows or shovels are connected to a bar, G, Fig. 3, by links H, and whereby they can be lifted from the ground by means of the lever I, to which said bar G is connected by a link, J, Fig. 1. To the top of each gang of shovels is secured a seed-box, K, in the bottom of each of which is fitted a slide, L, having in the middle thereof a hole or cup, $a$. Said slides are connected to each other by links M, Fig. 3, one end of each of which is pivoted to the slide; whereas, the other is pivoted to the lever N, and whereby said slides are operated jointly for a purpose presently shown.

The practical operation of the above-described machine is as follows: To use the machine as a corn-planter, the grain is placed in the seed-boxes K, which are the same distance apart that the rows of corn are to be planted. The driver takes his place on the seat O, and a boy, for operating the slides of the seed-boxes, on the seat P. As the machine moves forward and the seed-boxes come over the marks or crossing of the marks where the corn is to be dropped, the boy pushes the lever N in the direction of the dotted line $b$, Fig. 3. This moves the slides in the direction of the arrow, thereby moving the hole $a$ from the compartment 1, as shown in Fig. 2, to the compartment 2 of the box, thereby bringing the hole or cup $a'$ over a corresponding hole in the bottom of the box, through which the seed falls to the ground. The movement of the slide is now immediately reversed. The cup is again filled from the grain in the compartment 1 of the seed-box. The cup, having a holding capacity of about four or six grains of corn, is again at the proper time pushed into the compartment 2 by operating the slides, as before. As the slide passes under the partition $g$ of the box the grain in the cup, or so much as may be above the brim thereof, is swept off, so that the exact number only is carried out into the compartment to be dropped into the hill, the ground being opened by the shovel D for the reception of the grain, and which is covered by the side shovels D'. In this way two rows of corn are planted at once and properly covered.

In using the machine for cultivating the seed-boxes may or may not be taken off, as they in no way interfere with the working of the machine while being used in this capacity.

Claim.

What I claim as my improvement, and desire to secure by Letters Patent, is—

The links E E and axle B, in combination with the sub-links F F and D, serving as a cultivator, and supporting the hoppers K K, and leaving the shovels D' D' free to vibrate, as and for the purpose specified.

CAMDEN L. WILCOX.

Witnesses:
J. H. BURRIDGE,
D. L. HUMPHREY.